Jan. 22, 1957

E. R. NUTTALL 2,778,697

SELF-LOCKING CONNECTOR

Filed Nov. 3, 1955

Inventor:
Elmer R. Nuttall
by Howson & Howson
Attys

United States Patent Office 2,778,697
Patented Jan. 22, 1957

2,778,697
SELF-LOCKING CONNECTOR

Elmer R. Nuttall, Philadelphia, Pa., assignor to France Packing Company, Philadelphia, Pa., a corporation of Pennsylvania Application November 3, 1955, Serial No. 544,736

5 Claims. (Cl. 309—43)

This invention relates to an improved device for connecting the free ends of a length of open-wound coil spring for the purpose of forming said spring into a continuous ring, one important use for a ring of this character being as a radial expander for certain types of piston ring.

A principal object of the invention is to provide a functionally improved connector of the stated character.

A more specific object is to provide a connector which is positive in its primary function as a connector, and which will also afford complete freedom in the spring expander to exert a uniform radial force over the entire inner periphery of the piston ring.

Another object of the invention is to provide a connector which will leave the expander free to compensate for irregularities in either the piston groove or the ring to the end that the desired uniform radial pressure on the ring may be obtained.

Still another object of the invention is to provide a connector which will not affect the functional characteristics of the expander in the area embraced by the connector.

A further object of the invention is to provide a connector which will permit the end portions of the expander spring which are engaged and held by the connector to assume a normal arcuate form to the end that the annular expander is of uniform radius throughout.

A further and important object of the invention is to provide a connector which will afford a positive stop for the terminal ends of the spring so that the connector is immobilized in the ends of the spring and is positively prevented from movement relative to the spring that might result in release of the ends of the latter.

The invention contemplates also provision of a connector of extremely simple and economical form and one which is readily assembled with the coiled spring to produce the desired annular element.

The invention will be more readily understood by reference to the attached drawings wherein.

Figure 1:
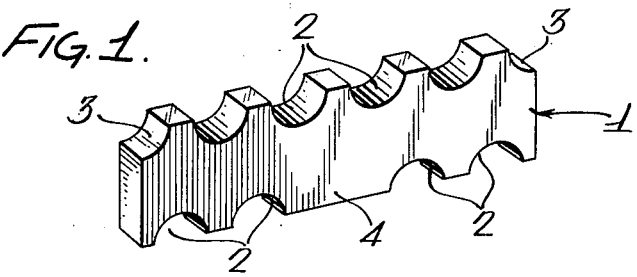
Fig. 1 is a view in perspective of a connector made in accordance with the invention.

In the embodiment of the invention illustrated in Fig. 1, the connector takes the form of a short strip 1 of sheet metal or other suitable material of a gauge to afford an adequate degree of strength for the intended function. This strip 1 is characterized by the provision in one longitudinal edge of a continuous series of uniformly spaced semi-circular recesses 2, the spacing of which conforms to the spacing between the convolutions of the coil of the spring with which the strip is to be used as hereinafter described. The opposite side of the connector strip 1 is provided with a similar set of semi-circular recesses 3, although in this instance the series is interrupted at the longitudinal center of the strip as indicated at 4. The two recesses 3, 3 at each opposite side of the unrecessed mid-portion 4 are staggered transversely of the strip with respect to the corresponding recesses 2 in the opposite edge. It is evident that with this arrangement the one end of the connector may be threaded into one end of the coil spring section 5 with which this connector is to be used, as illustrated in Fig. 2, until the terminal end of the coil engages the unrecessed mid-section 4, it being noted that the relative dimensions of the coil and connector element are such as to afford clearance between the edges of the recesses 2 and 3 and the convolutions of wire occupying said recesses so that the connector strip has a degree of looseness in the coil.

Figure 2:
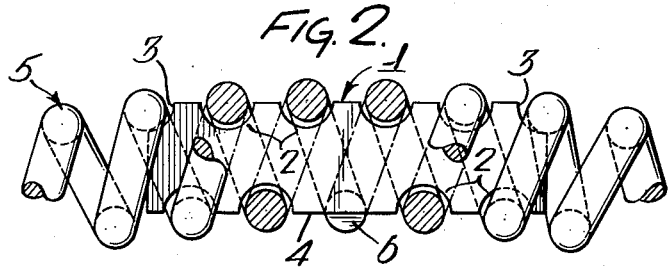
Fig. 2 is an enlarged fragmentary view partly in section showing the manner in which the connector may be assembled with the coiled spring to form an annular piston ring expander.

With further reference to Fig. 2 and as noted above, the extent to which the connector element 1 may be threaded into the end of the wire coil 5 is limited by engagement of the terminal end 6 of the coil with the unrecessed portion 4 of the connector element. It will be apparent also that after twisting the ends of the coiled wire in opposite directions it will be possible to effect the insertion of the connector 1 by threading action in both ends of the coil and to the full extent permitted by the abutment 4, so that when the connector is fully assembled with the wire coil as shown in Fig. 2 the coil will be free from twist in the annular assembly which it now forms with the connector 1. In this assembly, both terminal ends of the wire are in abutment with the unrecessed portion 4 of the connector, but with opposite faces respectively of said portion, and by reason of such abutment, the connector element is precluded from turning in either direction relative to and in effect is locked in the ends of the coil and can be removed only by material distortion of the wire or by again twisting one or both ends of the coil about the longitudinal axis of the latter to an extent unthreading the coil from the connector.

In the embodiment illustrated in Fig. 2, the terminal ends of the wire of the coil occupy positions at the inner radius of the annulus. In this case also, while the connector 1 is flat and straight, its relatively short length plus the substantial clearances provided between the edges of the connector and of the recesses 2 and 3 and the convolutions of the coil avoids distortion of the coil by the connector from the desired annular form of uniform radius throughout. Also, in the area of the annulus which embraces the connector, the coils are left free for any degree of radial compression of either the coil or the annulus which might be required in the function of the annulus as a piston ring expander, so that the pressure exerted on the ring by the expander when so radially compressed will be uniform throughout the annulus. The longitudinal edges of the connector may be slightly curved to conform to the curvature of the annulus if desired.

Figure 3:
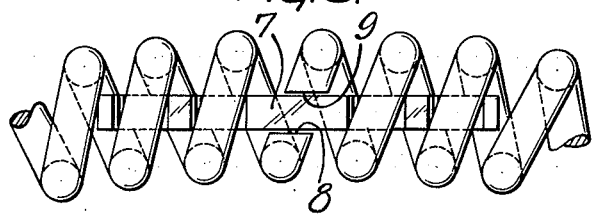
Fig. 3 is a view similar to Fig. 2 showing the connector in a preferred position of assembly with respect to the spring.

The same straight type of connector may be used, and preferably is used, in the manner illustrated in Fig. 3. In this case the connector 7 occupies a plane 90° removed from the radial plane of the expander in which it is shown in Fig. 2. The terminal ends 8 and 9 of the spring are formed accordingly, so that they may abut the opposite faces of the connector in this different plane. Here again the clearance between the connector recesses and the intersecting convolutions of the spring will be such as to accommodate the curvature of the expander. It is evident that this arrangement will afford a somewhat greater lattitude for radial compression of the spring expander.

Figure 4:
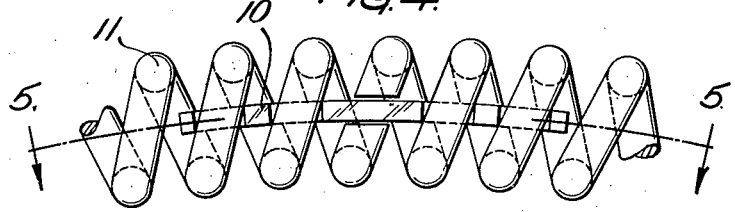
Fig. 4 is an enlarged fragmentary sectional view corresponding to Fig. 2 but illustrating a modification within the scope of the invention.
Figure 5:
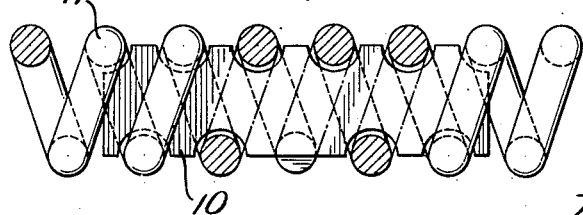
Fig. 5 is a sectional view on the line 5—5, Fig. 4.

The assembly shown in Fig. 4 is the same as that of Fig. 3 except that the connector 10 is bowed to conform to the curvature of the expander spring 11.

While the connector may be conveniently and economically produced from metal, it is evident that other materials may be employed without departure from the invention.

I claim:

1. In means for connecting the ends of a length of open-wound coil spring to produce an annular spring assembly, a self-locking connector designed for threaded engagement with the ends of the coil and having opposite longitudinal edge portions provided with recesses spaced in accordance with the convolutions of the spring and relatively arranged to receive the latter, the said recesses forming a continuous series throughout one of the edges and an interrupted series at the opposite edge so as to provide at the latter edge an intermediate unrecessed portion forming a common abutment for both terminal ends of the coil, said abutment precluding angular movement of the connector in the coil about its longitudinal axis in either direction.

2. A self-locking connecting means according to claim 1 wherein the recesses are dimensioned so as to afford clearance between the connector and the coil.

3. A self-locking connecting means according to claim 1 wherein the connector takes the form of a strip of sheet material.

4. An annular expander for piston rings consisting of a length of open-wound coil spring having its ends united by a self-locking connector according to claim 1, said expander exhibiting radial pressure characteristics substantially uniform throughout the entire circumference of the annulus.

5. A resilient annulus consisting of a length of open-wound helical spring the free ends of which are united by a strip of sheet metal having recessed edges interengaged with the convolutions of the helix, the extremities of the spring abutting opposite sides of the strip and being aligned one with the other so as to afford a substantially symmetrical annulus whereof the component helical spring is continuous throughout except for a single interruption corresponding in length measured along the helix to the thickness of said strip.

References Cited in the file of this patent

UNITED STATES PATENTS

| | | |
|---|---|---|
| 1,378,507 | Wiegand | May 17, 1921 |
| 2,234,504 | Robinson | Mar. 11, 1941 |
| 2,452,503 | Teetor | Oct. 26, 1948 |

FOREIGN PATENTS

| | | |
|---|---|---|
| 3,385 | Great Britain | Mar. 10, 1886 |